Oct. 27, 1970  B. H. MATTHEWS ET AL  3,536,973
SWITCH AND SPEED CONTROL FOR ELECTRIC MOTOR
Filed Feb. 1, 1968

INVENTOR.
BENJAMIN H. MATTHEWS
JULES W. RHINE
ROBERT W. BITTEL
RICHARD A. LOVELACE
BY Baldwin, Egan, Walling & Fetzer
ATTORNEYS Oct. 27, 1970   B. H. MATTHEWS ET AL   3,536,973
SWITCH AND SPEED CONTROL FOR ELECTRIC MOTOR
Filed Feb. 1, 1968   5 Sheets-Sheet 4

INVENTOR.
BENJAMIN H. MATTHEWS
JULES W. RHINE
ROBERT W. BITTEL
BY RICHARD A. LOVELACE
Baldwin, Egan, Walling & Fetzer
ATTORNEYS

United States Patent Office 3,536,973
Patented Oct. 27, 1970

3,536,973
SWITCH AND SPEED CONTROL
FOR ELECTRIC MOTOR
Benjamin H. Matthews, Peninsula, Jules W. Rhine, Bedford, Robert W. Bittel, Parma Heights, and Richard A. Lovelace, Cuyahoga Falls, Ohio, assignors to Lucerne Products, Inc., Northfield, Ohio, a corporation of Ohio
Filed Feb. 1, 1968, Ser. No. 702,272
Int. Cl. H01c 9/08
U.S. Cl. 318—345
19 Claims

ABSTRACT OF THE DISCLOSURE

A compact electric switch for variably controlling the speed of an electric motor and for making and breaking the circuit in both conducting lines from a source of electrical energy. The switch includes two sets of stationary contacts with each set comprising at least a pair of stationary contacts disposed in spaced relation to each other, and having an electrically conductive bridging contact co-acting with the respective stationary contacts. The bridging contact is movable by an actuator or trigger member between a non-bridging position wherein the bridging contacts are out of engagement with at least one of the stationary contacts of the associated set, and a bridging position wherein the bridging contact engages the associated stationary contacts of the respective set, to establish electrical conductivity therebetween. The switch includes a speed control assembly including a rheostat for providing a plurality of resistance values in a manner to control the application of variable multitudes of electrical energy, for selectively varying the speed of an electric motor. At least one of the sets of stationary contacts has an additional stationary contact associated therewith which is adapted to receive the bridging contact to bypass the rheostat means and supply the full scope of the source of electrical energy to the motor in a predetermined position of the trigger or actuator.

---

This application relates in general to a compact, electrical switch, and more particularly to a compact, electrical switch for selectively varying the speed of an electric motor such as, for instance, an electric motor of a hand-operated power tool.

There are numerous switches known in the prior art for controlling the speed of electrically powered hand-type tools. However, such switches, and especially those of compact nature, are generally of relatively high cost which limits their use in many applications.

In United States patent application Ser. No. 481,564, filed Aug. 23, 1965 by Benjamin H. Matthews et al. now Pat. No. 3,389,365, there is disclosed an electrical control switch of a type comprising a bridging contact slidable with respect to spaced stationary contacts of the switch, between a non-bridging position and a bridging position, and vice-versa, for connecting and disconnecting a source of electrical energy to a circuit input, and including a second contact assembly having a rheostat with a slidably actuated rheostat element operable to adjust the rheostat and regulate the magnitude of electrical energy input to the circuit input.

The present invention provides a compact control switch arrangement of the above-discussed general type including bridging contact means which is adapted to be pivoted with respect to stationary contact means when the switch is in an "off" position and which bridging contact means is adapted to move or pivot into engagement with associated stationary contact means upon actuation of the switch to its "on" position, and in conjunction with continuously variable speed control means for selectively varying the magnitude of the electric energy to the motor, thus providing for smoothly varying the speed of the electric motor, and wherein bridging contact means is provided in both lines of the conductors from the source of electrical energy to the electric motor, rather than in only one line thereof. The present invention also provides a highly compact electrical control switch which can be expeditiously manufactured and assembled, and which results in a switch for smoothly and effectively controlling the speed of an electric motor.

Accordingly, an object of the invention is to provide a novel electrical control switch.

Another object of the invention is to provide a novel electrical control switch of the variable speed type.

Another object of the invention is to provide a trigger-electrical control switch assembly of the variable speed control type comprising trigger actuated movable bridging contact means slidable with respect to spaced stationary contact means, for making and breaking the switch circuit, and wherein actuation of the trigger actuates a novel rheostat arrangement for varying the magnitude of electrical energy input to an electric motor.

A further object of the invention is to provide a trigger-switch assembly of the latter mentioned type which is highly compact, is economically constructed, is conveniently assemblable, and is capable of being mass produced.

A still further object of the invention is to provide a trigger-switch assembly wherein the electrical control switch is of the latter mentioned variable speed control type and which comprises a movable bridging contact in each side of the line of electrical energy, and adapted to move relative to a pair of stationary switch contacts in in order to make and break the circuit, and with the switch comprising an electrically conducting slide element actuated by movement of the trigger and engageable with a rheostat bar for selectively varying the speed of an electric motor responsive to movement of the slide element, with said stationary contacts being electrically connected to unidirectional or bidirectional solid state switch means which includes time constant circuit means adapted to provide pulsive energy to the electric motor for energizing the latter at correspondingly variable speeds.

Other objects and advantages of the invention will be apparent from the following description taken in conjunction with the accompanying drawings wherein:

FIG. 6 is an enlarged bottom plan view of the trigger-switch assembly of FIG. 1;

Figures 1, 2, 3, 4, 5, 8:
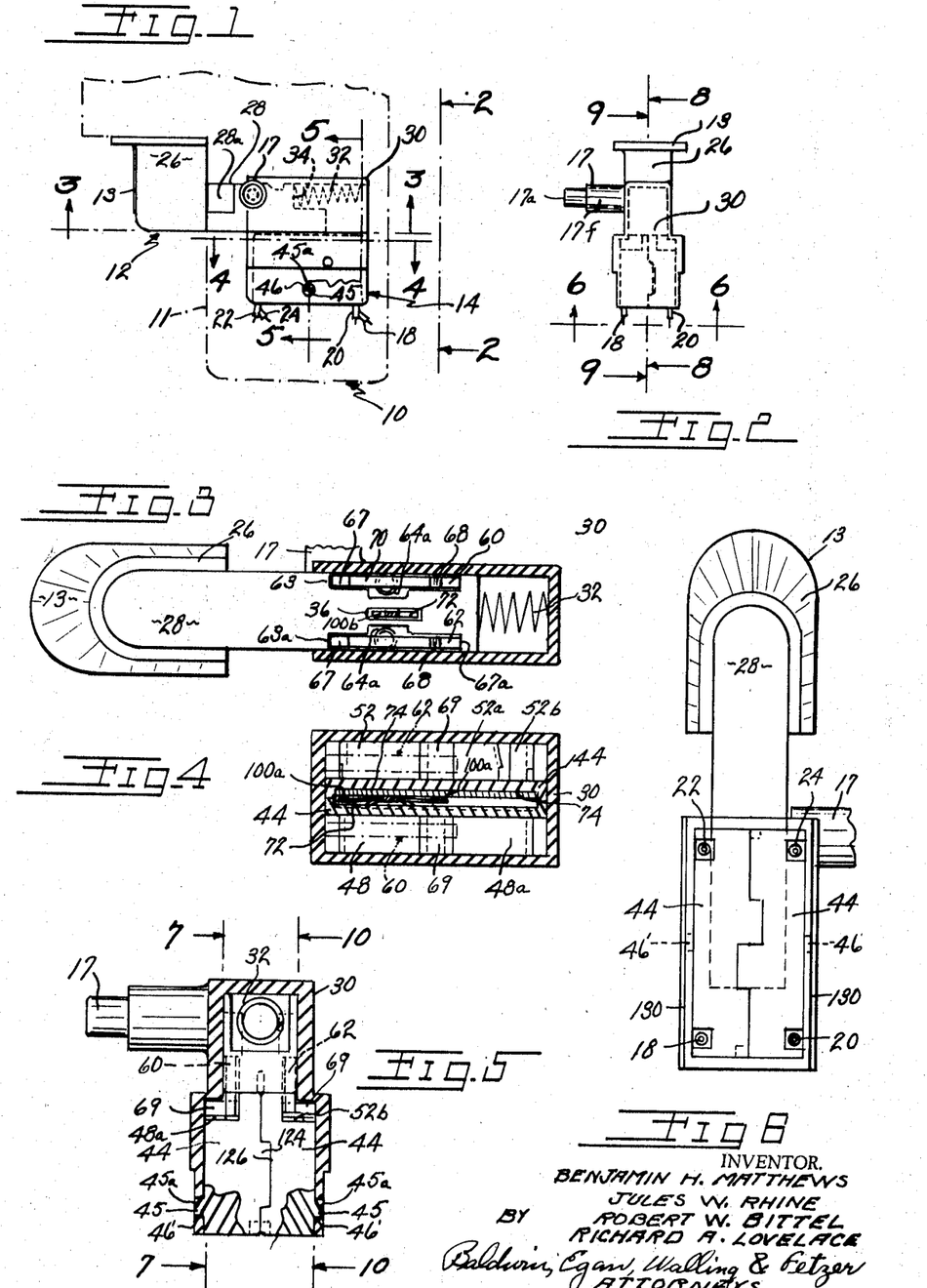
FIG. 1 is a fragmentary, side-elevational diagrammatic illustration of a portable electrical tool embodying the present invention, with the tool handle being illustrated in phantom lines, and with the trigger-electrical control switch assembly of the present invention being illustrated in full lines.
FIG. 2 is a rear-end elevational view of the trigger-switch assembly illustrated in FIG. 1 and taken generally along the plane of line 2—2 of FIG. 1 looking in the direction of the arrows.
FIG. 3 is an enlarged sectional view of the trigger-switch assembly of FIG. 1 taken generally along the plane of line 3—3 of FIG. 1, looking in the direction of the arrows.
FIG. 4 is a sectional view of the trigger-switch assembly of FIG. 1 taken generally along the plane of line 4—4 of FIG. 1 looking in the direction of the arrows.
FIG. 5 is a sectional view of the trigger-switch assembly of FIG. 1 taken generally along the plane of line 5—5 of FIG. 1 looking in the direction of the arrows.
FIG. 8 is a sectional view of the trigger-switch assembly taken generally along the plane of line 8—8 of FIG. 2 looking in the direction of the arrows.

Referring now again to the drawings, FIG. 1 illustrates a power tool 10 with which the present invention may be incorporated. The tool may be of a portable type which may include a depending piston grip-like handle 11 having a trigger-switch assembly 12 mounted therein, which is adapted to control the operation of an electric motor (not shown) powering the tool.

The trigger 13 of the trigger-switch assembly may be of the more or less conventional reciprocal spring-loaded type, and which coacts with speed control switch 14 for actuation of the latter.

The trigger-switch assembly may include a locking mechanism including a spring-loaded pin 17 for locking trigger 13 in its fully inward or maximum "on" position. Electrical leads 18, 20 may extend from the trigger-switch assembly and form part of an electrical cord for coupling the tool to a suitable source of electrical power. Electrical leads 22, 24 may also extend from the trigger-switch assembly and form the connection to the electrical motor that is controlled by the trigger switch assembly.

The trigger 13 of the trigger-switch assembly may comprise a head portion 26 and an elongated slide portion 28 extending rearwardly from the head portion, and being received in a housing 30 which also houses the switch components. A spring 32 coacting between the rear wall of the housing and the recess 34 in the slide portion of the trigger acts to urge the trigger outwardly of the housing and to an "off" position. The underside of the slide portion of the trigger has a recess 36 formed therein for a purpose to be hereinafter described in detail. The slide portion also has an abutment 38 formed thereon which is adapted to engage a shoulder 40 on the underside of the top wall 41 of the housing 30 to limit outward movement of the trigger with respect to the housing.

The components of speed control switch 14 are housed primarily in a split or two-section switch case 44 (FIGS. 11 and 12) which in turn is received within the lower section 46 of housing 30 in fastened, generally snug relation, thus retaining the speed control switch in housing 30. In this connection, case 44 may be provided with projections 45 (FIG. 5) formed on the sides thereof and having sloping top surfaces 45a, which projections are received in snap fastened relation in openings 46 in housing 30 when switch case 44 is inserted into the open undersides of housing 30. Case 44 may be formed of plastic or some other electrically insulating material. The same holds true for housing 30.

Figure 7:
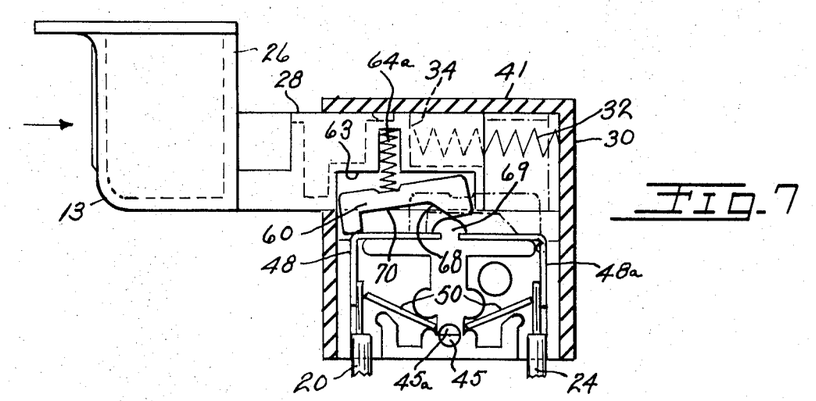
FIG. 7 is an enlarged sectional view of the trigger-switch assembly taken generally along the plane of line 7—7 of FIG. 5 looking in the direction of the arrows.
Figure 8:
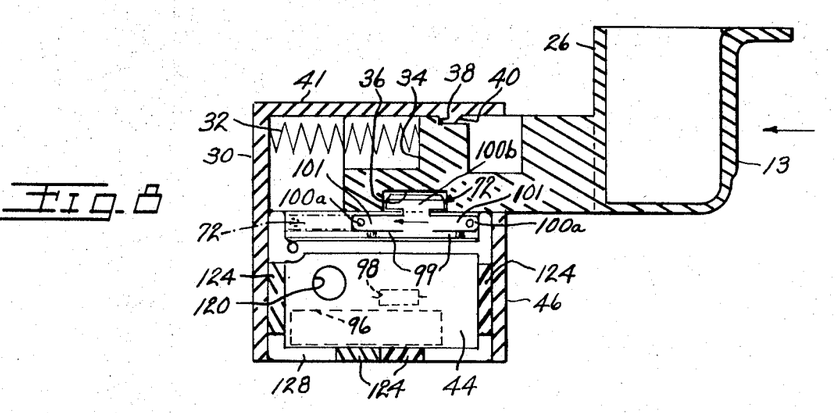
Figure 9:
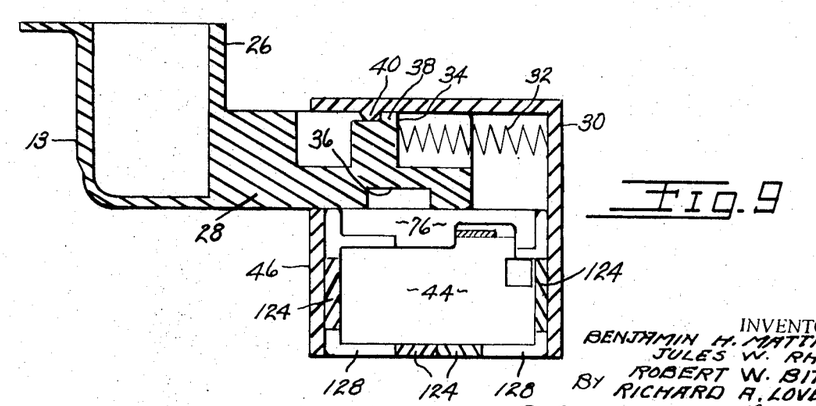
FIG. 9 is an enlarged sectional illustration of the trigger-switch assembly taken generally along the plane of line 9—9 of FIG. 2 looking in the direction of the arrows.
Figures 14, 14A, 14B:
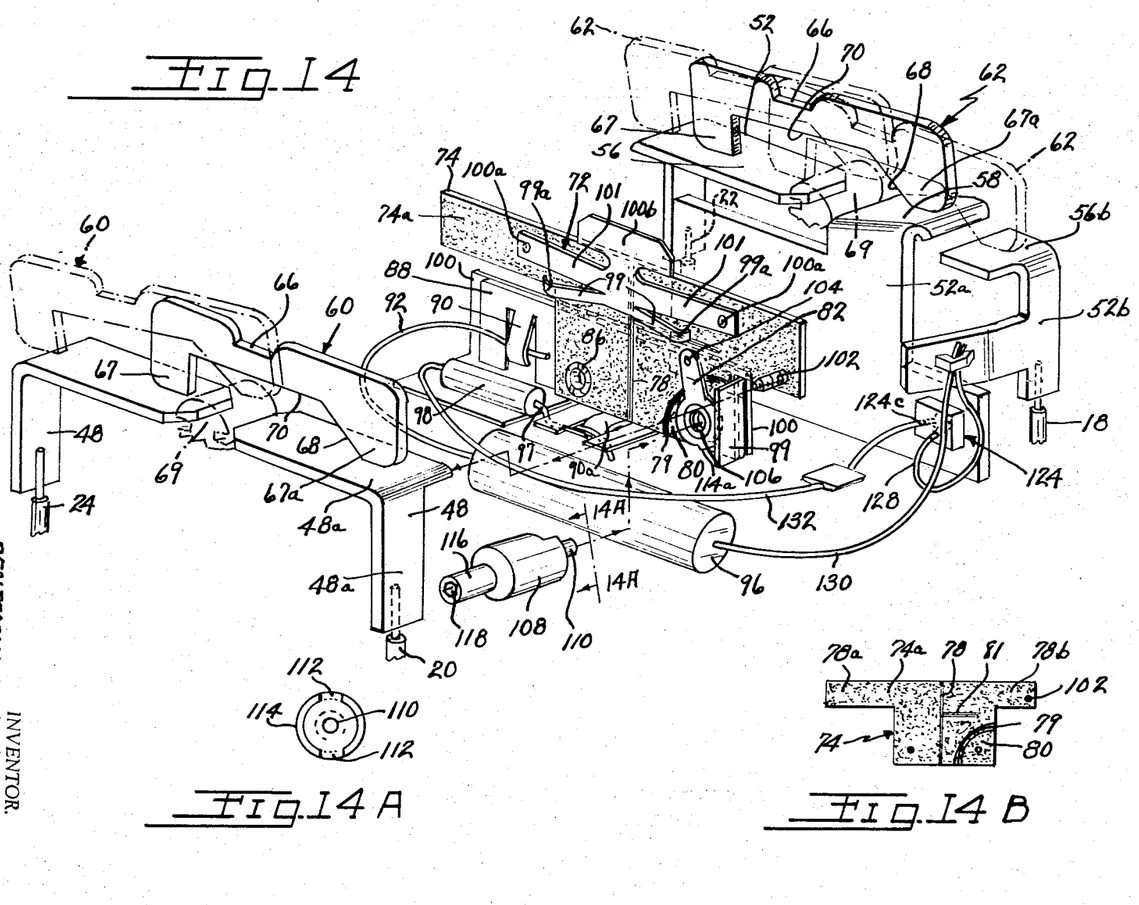
FIG. 14 is an enlarged, exploded illustration of the component parts of the variable speed control switch, which are adapted for disposal in and on the switch casing of FIGS. 11 and 12 and in the housing of FIG. 13, and illustrating with phantom lines various positions of the movable bridging contacts which are slidable with respect to the stationary contacts, and adapted for connection into each of the conducting lines from the source of electrical energy and to the load to be controlled, and showing "off" and "on" positions of such bridging contacts.
FIG. 14A is an end view of a knob element of the assembly of FIG. 14 which is adapted for providing expeditions adjustment of the trimmer of the switch circuit.
FIG. 14B is a reduced size, side elevational view of the resistance strip of the rheostat mechanism of the switch.

Mounted on one side of the switch case 44 and extending generally lengthwise along the upper portion of the switch case are a pair of stationary electrically conducting contacts 48, 48a (FIGS. 7 and 14). Stationary contact 48 is adapted for engagement with electrical power line 24 connecting to one side of the motor M while stationary contact 48a is adapted for connection to the electric line 20, and as can be best seen in FIG. 7. In this connection, resilient clip or spring means 50 may be provided for providing positive engagement of the bared wires of conductor lines 20 and 24 with the respective stationary contact member, such securement structure being known in the art as a "plug in" terminal.

Figure 10:
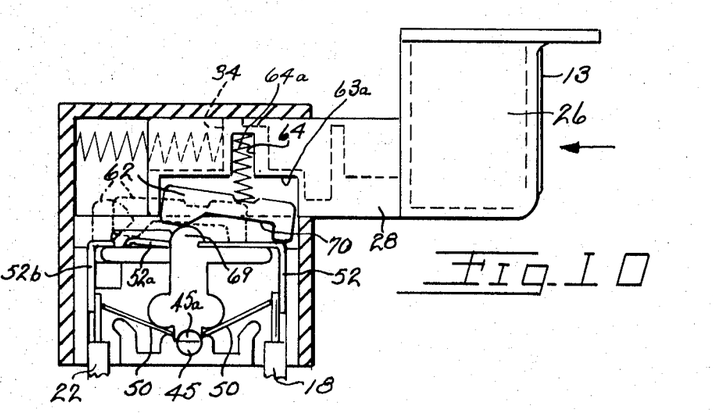
FIG. 10 is an enlarged sectional illustration of the trigger-switch assembly taken generally along the plane of line 10—10 of FIG. 5 looking in the direction of the arrows.

The other side or section of the switch case is provided, in the embodiment illustrated, with a set of three electrically conducting, spaced stationary contact elements 52, 52a and 52b respectively (FIGS. 10 and 14). Stationary contact 52 is adapted for coupling to the motor line conductor 22 while rearwardmost stationary contact 52b is connected to the electrical power source conductor 18 as best shown in FIG. 10. Contacts 52 and 52b have generally horizontally extending contact surface portions 56 and 56b respectively while contact member 52a has a relatively diagonally upwardly extending camming surface portion 58 thereon, which extends to a level above surface portion 56b of contact 52b. Contact 52a preferably also serves as a heat sink for the semi-conductor device utilized in the switch circuit as will be hereinafter described.

The switch is of the type which makes and breaks contacts in both sides of the electrical energy source conducting lines. In other words, there is a simultaneous making and breaking of the circuit in both conductor lines 22 and 24. In this connection, associated with each of the sets of stationary contacts is a bridging contact member 60 and 62 respectively. Each of said bridging contact members may comprise an elongated body portion of electrical conducting material and which is received in an associated slot 63, 63a formed in the corresponding side of the body portion 28 of the trigger, and as can be best seen in FIGS. 7 and 10. Thus the bridging contact members are movable with the trigger during inward and outward movements of the trigger actuator into and out of the housing 30.

Body portion 28 of the trigger may be also provided with recesses 64 communicating with the respective slot 63 or 63a and receiving therein a spring 64a which is adapted to engage a cut out portion 66 on the associated bridging contact member, for urging the contact member downwardly.

Depending from adjacent the forward and rearward ends of each bridging contact member 60 or 62 there may be foot portions 67, 67a, with foot portion 67a having a sloped camming surface 68 formed thereon adapted for engagement with an electrically non-conducting abutment or projection 69 extending upwardly from the associated side or section of the switch case 44, for maintaining the bridging contact in an upwardly swung position with respect to the underlying stationary contact 48a or 52b, when the trigger is in the "off" position illustrated for instance, in FIGS. 7 and 10. Inward movement of the actuator or trigger 13 causes the bridging contact members 60, 62 to be moved rearwardly with the trigger, or in other words inwardly of the housing 30, such inward movement causing the bridging members to slide along the respective stationary contact members and due to the action of the springs 64a, to be moved generally simultaneously downwardly into engagement with the underlying stationary contacts 48a or 52a, thereby placing the switch in "on" condition. It will be understood of course that during movement of the trigger and associated bridging contacts in the aforementioned inward direction, the bridging contacts slide over upon and relative to the associated projection 69 to thence carry the bridging contact over the associated projection until it is received within the recessed area 70 of the respective bridging contact. The spring 64a associated with each bridging contact causes the latter contacts to pivot or swing downward so as to enable the rearward contact face on foot portion 67a to drop onto the underlying stationary contact 48a or 52a, after which the face slides upon the contact surface.

Outward movement of the trigger and associated bridging contact members with respect to the housing 30 as caused by the aforementioned compression spring 32 causes the associated projection 69 on the switch case sections 44 to engage the cam surface 68 on the associated bridging contact, and swing its rear foot contact face upwardly out of engagement with the underlying stationary contact, and to the positions illustrated in full lines in FIGS. 7 and 10 of the drawings.

Coupled to the body portion 28 of the trigger is an electrically conducting slide element 72 (FIG. 14) which is adapted for sliding engagement with resistance strip or bar 74 mounted in the split switch case 44, and projecting upwardly through a top slot 76 (FIG. 12) in the upper portion of the switch case. Resistance strip 74 which is utilized as a rheostat as described herein may be of generally off-set T-shaped configuration in side elevation as best illustrated in FIGS. 14 and 14b. The rheostat bar or resistance strip 74 may comprise a base formed of electrical insulating material, such as for instance a synthetic plastic, covered or coated on one side surface thereof with a carbon layer 74a forming a preselected value of resistance. The carbon layer may be grooved completely down to the insulating base as at 78 (FIG. 14) to divide the resistance strip into two portions, 78a (a forward portion) and 78b (a rearward portion) respectively. The carbon layer of the resistance strip may also be grooved as at 79 for providing an isolated mounting section 80 for a trimmer 82, and grooved as at 81 to connect with groove 78 and partially isolate the trimmer engaging portion of the resistance strip from the slide contactor 72 engaging portion. The resistance strip is secured as by means of a metal rivet 86 extending through an opening therein, to a connector plate member 88 extending lengthwise adjacent to the resistance strip. Connector plate 88 is of electrically conducting material and has clip means 90, 90a formed thereon for connecting thereto respectively a line 92 from capacitor 96 and a line 97 to a triggering device 98 which is herein disclosed to be a neon bulb, said components comprising a part of the control circuitry presently to be described. Connector plate 88 may include an outwardly projecting end flange portion 99. An insulating member 100 extends lengthwise along the outer side of the connector plate for the full length thereof, and also beneath the triggering device 98, thus insulating the connector plate from contact with the stationary contact members 52 and 52a, when the parts of the switch are assembled in the switch case 44.

Slide element 72 includes spring arms 99 having arcuate end portions 99a adapted to be received in groove 100 in one section of switch case 44, for guiding and retaining slide element 72 in predetermined location with respect to resistance strip 74, during lengthwise movement of element 72 to adjust the speed of the associated electric motor. Element 72 may also have bosses 100a (FIG. 14) thereon adapted for positive engagement with the resistance coating 74a on resistance strip 74, and tab 100b projecting upwardly from boss carrying arms 101 thereof for coacting with slot 36 in the underside of body portion 28 of the trigger, for coupling the slide element 72 to the trigger 13.

Extending laterally from the coated side of the resistance strip 74 is a preferably resilient connector 102 formed, in the embodiment illustrated, of an electrically conducting spring secured in electrically conducting relation to the resistance coating 74a and having a solid head portion fixed to the outer end of the spring. Such connector is adapted to engage the inner edge of stationary contact 48a when the switch components are in assembled relation on the switch case as illustrated in FIG. 14, and thus electrically connect the resistance strip 74 to the stationary contact 48a.

The aforementioned trimmer 82 comprises a rotary arm having a boss 104 on the inner side thereof adapted for engagement with the lower portion 78c of section 78b of the resistance strip 74 disposed between grooves 78, 81 and 79 with the arm being rotatably secured as by means of a metal rivet 106 to the resistance strip and to the connector plate 88. Accordingly, as will be hereinafter more apparent, the resistance portion 78c of trimmer 82 is in effect in parallel with the series connected resistance strip 78a, 78b and one end of said combination in turn is connected through spring 102 to the stationary contact 48a. Likewise, the opposite end of said parallel resistance combination, which is the connector plate 88, is connected to one side of the triggering device 98 and capacitor 96.

Figure 13:
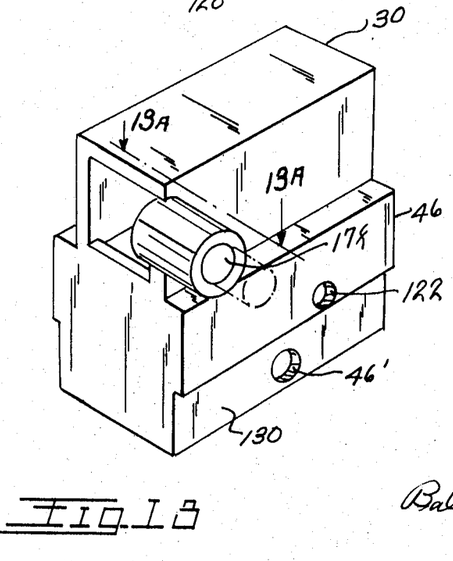
FIG. 13 is an enlarged perspective illustration of the main housing of the control switch which is adapted to receive therein the switch casing of FIGS. 11 and 12 and the trigger or actuator for the switch.

Now in order to be able to adjust the position of the trimmer arm 82 with respect to the resistance strip 74, from exteriorly of the switch there is provided a rotary trimmer knob 108 (FIG. 14) comprising a shank 110 adapted to extend into the rivet connecting the trimmer arm to the resistance strip and connector plate, with such trimmer knob having opposed slots 112 thereon (FIG. 14A) defined by arcuate flanges 114, which slots receive therein the portions of the trimmer arm, thus coupling the knob to the trimmer arm. The other end of the knob 108 has an elongated stem 116 having a socket 118 therein adapted to receive a wrench or similar tool, for selectively rotating the knob and thus causing pivotal or rotary movement of the trimmer arm to adjust the position of the trimmer arm and thus the resistance to the motor. This can be done from exteriorly of the switch housing 30 and in this connection the switch case 44 (FIG. 11) is provided with an opening 120 therethrough adapted to rotatably support stem 116 on knob 108, in alignment with opening 122 (FIG. 13) into which can be inserted a socket wrench for turning the knob and thus turning the trimmer arm. Accordingly, adjustment of the trimmer arm can be accomplished from completely exteriorly of the trigger-switch assembly, and thus can be conveniently preset, prior to assembly of the trigger-switch mechanism into a tool.

Figure 11:
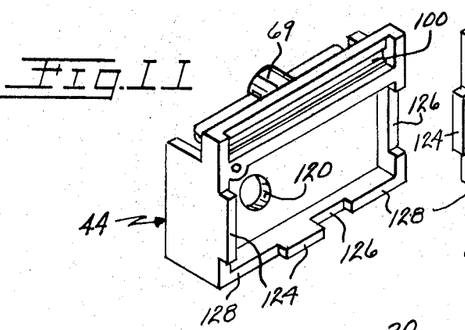
FIGS. 11 and 12 are perspective illustrations of the casing for the speed control portion of the switch, showing the interior construction of such casing portions.
Figure 12:
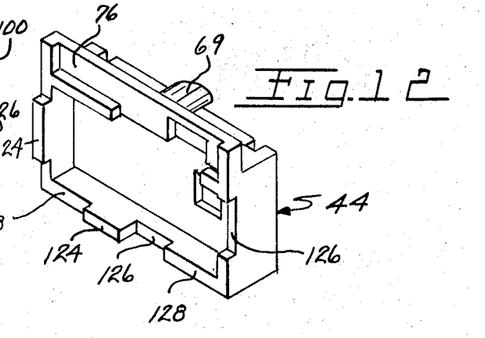

Referring now in particular to FIGS. 11 and 12, it will be seen that the switch case is of split, or two-piece molded construction, of electrical insulating material, and which has projection and recess means 124, 126 formed in the bottom and side edges of each section thereof, which are adapted to be received in complementary recess and projection means in the opposing section of the switch case, for fastening the case sections together after the component parts of the switch are inserted therein. The fit between the projection and the recess means 124, 126 is preferably a tight fit, so that when the two sections are fitted together and forced into abutting relation on their inner edge surfaces 128, the switch case stays in assembled relation whereupon it can be readily inserted from the open underside of the housing 30 into its position in the housing, to be held in snap-fastened condition by lugs 45, thus completing the assembly of the variable speed control mechanism with the actuator mechanism. Side walls 130 of housing 30 have sufficient resiliency to permit switch case 44 and laterally projecting lugs 45 to readily move into the underside of housing 30.

Operation of the switch assembly may be as follows. In the position shown in FIG. 1 which corresponds to the full line positions of the bridging contact members 60, 62 shown in FIGS. 7 and 10, the switch is in "off" position and the connector lines 22 and 24 are open due to the pivoted condition of each of the bridging contact members with respect to its underlying stationary contact 48a and 52a. Upon inward movement of the trigger 13, the stationary contact members pivot downwardly due to associated springs 64a, thus closing the circuit in line 24 and closing the contact in line 22, causing actuation of the motor M. As the body portion 28 of the switch moves inwardly of the housing 30, the slide element 72 and bridging contacts 60, 62 are moved rearwardly or to the right as seen in FIG. 7 with respect to the resistance strip 74.

As aforementioned, a universal type of motor M may be utilized in the tool 10 as diagrammatically shown in FIG. 1, and which is designed for operating in either alternating or direct current circuits. The instant variable speed control arrangement, when used in an alternating current circuit, is adapted to deliver discrete pulses or slugs of energy of predetermined quantity and cyclic rate to the motor. Inasmuch as the speed of the motor depends upon the energizing rate and current, the motor speed will correspondingly change in proportion thereto.

The electrical and mechanical components of the switch assembly as thus described are connected with additional components to form a variable speed control circuit for controlling the speed of the motor M.

Figure 15:
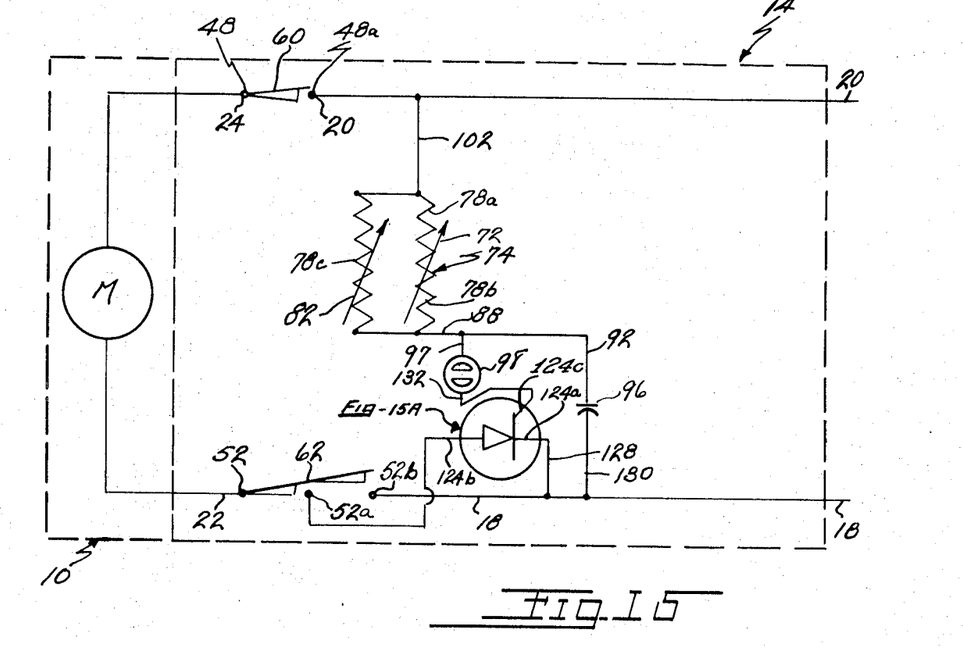
FIG. 15 is a schematic illustration of the electrical control switch as coupled to a motor of, for instance, the power tool illustrated in FIG. 1, incorporating a first embodiment of especially adapted control circuitry to provide half-wave variable control of the electrical energy to the motor of the tool for selectively controlling the actuation and speed of the tool.

One embodiment of such circuit is shown in FIG. 15 and is capable of providing half-wave control of electrical energy to said motor.

This circuit is seen to include a silicon controlled rectifier 124 of conventional solid-state design and which has anode, cathode and gate electrodes 124a, 124b, and 124c respectively.

The rectifier is seen to be preferably encased within a box-like casing 125 which is securely mounted by soldering or the like upon the surface of metallic contact 52a, as best seen in FIG. 14, so that the anode electrode 124a is in direct conductive contact with said surface.

The cathode electrode 124b is connected by its conductor 128 to the stationary contact 52b while the gate electrode 124c is connected by its conductor 132 to one side of the triggering device 98. The opposite side of said triggering device as aforementioned is connected by means of the conductor 97 to the metallic plate 88. The capacitor 96, as shown, is connected at one end to the stationary contact 52b and at its opposite end by conductor 92 to connector plate 88.

The motor M of the tool 10 is connected by its motor conductors 22 and 24 to stationary contacts 52 and 48 respectively of the switch, said conductors being "plugged" into the switch housing, as aforementioned, thus defining plug-in terminal connections.

In like manner, line conductors 18 and 20 are plugged into the switch housing into contact with stationary contacts 52b and 48a, respectively.

With this control circuitry incorporated into the instant switch assembly, and with the bridging contacts 60 and 62 disposed in their respective solid line positions as shown in FIGS. 7 and 10 respectively to define the open condition for said switch, the motor M is disconnected from the electrical line conductors 18 and 20.

Upon sliding the finger trigger actuator 13 to the right as viewed in FIG. 1, so that the bridging contact 60 pivots over the cam 69 to bring its leading end into contact with stationary contact 48a and in like manner to bring bridging contact 62 into contact with stationary contact 52a the motor M is connected across the power input leads 18 and 20, the connection to lead 18 being through the anode-cathode path of the silicon controlled rectifier 124.

As a result, the rotor of motor M begins to rotate at slow speed which, as is understood, is dependent upon the position then occupied by the rheostat slide element or bar 72 with respect to resistance portions 78a, 78b of strip 74.

As is likewise understood, the silicon controlled rectifier fires periodically during the portion of the cycle when the anode 124a is positive with respect to the cathode 124b, the duration of firing being dependent upon the gate voltage as applied to gate electrode 124c. The triggering device 98, which may be for example a neon trigger diode, is brought into conduction at a predetermined voltage level which may vary slightly according to its operational characteristics. The trimmer 82, which is in parallel with rheostat strip 74, is intended to be adjustable sufficiently to vary the voltage level across the diode 98 so as to provide the voltage level at which the particular diode actually requires to become conductive when the bridging contacts 60 and 62 engage stationary contacts 48a and 52a respectively.

When the diode 98 becomes conductive it gates the rectifier 124 and turns it on so that the charge accumulated on capacitor 96 will discharge and provide a pulse or slug or current to the motor M effective to cause the rotor to rotate.

As will be understood, the time constant of the resistor-capacitor circuit (78a, 78b, 78c and 96) will determine the time the diode 98 will conduct during the positive half-cycle. And, as the trigger actuator 13 is additionally moved to the right as viewed in FIG. 1, the (SCR) 124 will be fired progressively earlier in the positive part of each cycle whereby to provide corresponding larger slugs of current to the motor M effective to cause its rotor to revolve at a relatively faster rate.

It will be seen therefore that movement of the trigger from the "off" position with the bridging contact 60 engaging the underlying stationary contact 48a and with bridging contact 62 engaging the underlying middle stationary contact 52a, will vary the speed of the motor as dependent upon the position of the slide member 72 with respect to the resistance strip 74. When the bridging contact 62 is cammed upwardly on cam surface 58 by pressing the trigger actuator 13 further into housing 30 and then moves off said surface into engagement with cam surface 56 of stationary contact 52b, the electronic control circuitry is bypassed and full current flows to the motor M so that it will then run at full speed.

Figure 13A:
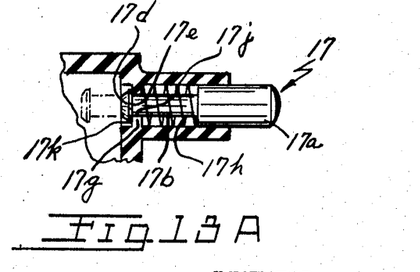

As previously mentioned, the instant switch assembly includes a locking mechanism which comprises pin 17 for locking trigger actuator 13 in its fully inward or maximum "on" position. As best seen in FIG. 13A, the pin 17, which is formed of a suitable plastic material is provided with a relatively large cylindrical head part 17a, an intermediate shank 17b, extending longitudinally therefrom and an inner head 17d, the latter being slightly larger in diameter than shank 17b so as to define an annular rim 17e at the juncture thereof.

The locking pin 17 is disposed within the cylindrical boss 17f formed on the side wall of housing 30 adjacent the upper end thereof through which the trigger actuator 13 is movable.

The boss 17f is provided with a wall 17g at its inner end in which an aperture 17j is centrally formed. The aperture 17j is smaller in diameter than the interior diameter of the boss so as to define an annular shoulder as shown at 17k.

The pin 17 is placed within boss 17f until the head part 17d abuts the inner wall 17g. By applying additional pressure to said pin, the head part 17d is forced through said aperture 17j against the pressure of spring 17h placed over said shank 17b. As herein shown, the spring 17h is thereby captured between the inner wall 17g and the head part 17a so as to bias the pin 17 outwardly of the boss 17f.

The inner head 17e of the pin 17, once it has passed the aperture, returns to its original shape and locks the pin in its assembled condition.

The slide actuator 28 of the trigger 13, as best seen in FIG. 1, is provided with a recess 28a which is open to the side facing the pin 17, and located adjacent the finger actuator part 26.

With this assembly, when the actuator 13 is pressed to its "full in" position within the housing 30, the recess 28a is directly opposite the pin 17 so that the latter may be pressed into the said recess to locate its head part 17d within said recess. Then, by releasing the trigger actuator 13 it moves outwardly of the housing 30 by reason of the spring 32 to the position where the head part 17d of said pin engages an upstanding wall 28b which stops further outward movement of said actuator.

The pressure exerted by spring 32 is sufficient to hold the pin in said recess 28a in opposition to the pressure of spring 17h whereby the operator may remove his finger from the actuator 13 and the latter remains in a locked position and the motor M will remain on at a corresponding speed.

Figure 15A:
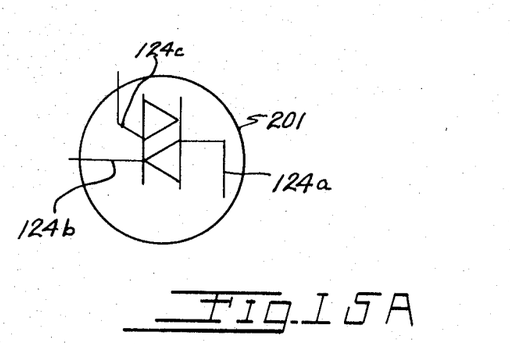
FIG. 15A is a partial schematic diagram of a second embodiment of control circuitry which may be incorporated as a part of the switch assembly and which is especially designed to provide full-wave variable control of the electrical energy to the motor of the tool.

Referring now to FIG. 15A there is herein diagrammatically shown a bidirectional device 201 such as a triac, as commonly referred to in the art, which is effective to provide a variable control of current to the motor M during both the positive and negative portions of each cycle of the electrical source voltage.

With this device 201 substituted into the control circuitry of FIG. 15 for the (SCR) 124 and connected in the manner shown, the current to the motor M may be varied as will be understood in each positive and negative portion of each cycle. For example, the triac 201 may be "turned-on" during any part of each positive and negative part of the cycle of the power source, which may be a conventional 60 cycle electrical source, as depicted by the shaded portion i of the waveform representing the "on time" for said device. As will be understood, by varying the RC time constant of the gate circuit for said triac device by varying the rheostat 74, the "on time" for said device may be variably changed.

As an example of a size of switch assembly embodying the present invention, a switch case 44 of approximately 1" long by 5/8" high by 1/2" wide has been determined to be satisfactory, and which case may be assembled into a switch housing 30 of approximately 2 1/8" long by 1 1/8" high by 5/8" wide. It will be seen, therefore, that the present arrangement is highly compact, greatly increasing its usability in varied environmental situations. If the switch mechanism in switch case 44 becomes inoperative due to wear and usage, case 44 may be readily snapped out of housing 30 and a new switch inserted therein, thereby providing for rapid repair of the switch assembly.

From the foregoing discussion and accompanying drawings it will be seen that the invention provides a novel variable speed control switch including a rheostat bar and a slide member adapted to coact with the rheostat bar for selectively and smoothly controlling the speed of an associated motor upon actuation of an actuator, and in circuit with a unidirectional or bidirectional solid state switch device as well as a switch that can be readily and conveniently assembled; and a switch that provides for making and breaking both conductor lines from a source of electrical energy, and also a switch which is extremely compact for convenient and ready assembly into a tool, such as for instance, a portable hand tool.

The terms and expressions which have been used are used as terms of description and not of limitation and there is no intention in the use of such terms and expressions of excluding any equivalents of any of the features shown or described, or portions thereof, and it is recognized that various modifications are possible within the scope of the invention claimed.

What is claimed is:

1. In a compact electrical speed control switch comprising at least two spaced groups of stationary contact means, each group having at least two contacts, a pair of bridging contact members each being movable with respect to one of said groups of stationary contact means from an off position wherein at least one of the bridging contact members is spaced from at least one of the contacts of its one associated group and to an on position wherein said one bridging contact member engages the two contacts of its said one associated group in an electrical conducting relation, each of said bridging contact members being operatively connected to a respective conducting line from a source of electrical energy for opening and closing the respective conducting line upon predetermined movement of the bridging contact member with respect to its said associated group of stationary contact means and actuator means for selectively moving said bridging contact means, rheostat means in circuit with said stationary contact means being operatively connected with said actuator means and actuated by the latter to provide a plurality of resistance values as determined by the position of said actuator means, and variable current control switch means in circuit with said stationary contact means and said rheostat means for providing pulsive energy to an electric motor.

2. A switch in accordance with claim 1 wherein said rheostat means comprises a resistance strip, and an electrically conductive contactor slidable relative to said resistance strip and coupled to said actuator means for actuation of said rheostat means upon actuation of said actuator means.

3. A switch in accordance with claim 1 wherein said control switch means comprises a unidirectional current control switch.

4. A switch in accordance with claim 1 wherein said stationary contact means of said one group comprises at least three contact elements in spaced relationship to one another, said bridging contact means being engageable with two of said three contact elements in said on position.

5. A switch in accordance with claim 4 wherein the middle stationary contact element has a camming portion thereon adapted to cam said bridging contact means upwardly prior to movement of said bridging contact means into engagement with the adjacent end stationary contact element.

6. A switch in accordance with claim 2 wherein said resistance strip comprises spaced resistance coatings electrically insulated with respect to one another.

7. A switch in accordance with claim 2 including a switch case in which said rheostat means is disposed and wherein said slide contactor comprises resilient means thereon coacting with means on said switch case for guiding movement of said contact along said resistance strip.

8. A switch in accordance with claim 2 including tab means on said slide contactor adapted for coaction with said actuator means for causing movement of said slide contactor upon movement of said actuator means.

9. A switch in accordance with claim 6 including resilient means secured to said resistance strip in electrically conducting communication with one of said resistance coatings and adapted for engagement with one of said stationary contact means for coupling the latter in circuit with said resistance strip.

10. A switch in accordance with claim 1 wherein said variable current control switch means is coupled between said groups of stationary contact means, said switch means having anode, cathode and gate electrodes and with time constant circuit means including capacitance means connected across the conducting lines of said electrical source and to said gate electrode, said switch means adapted to provide pulsive energy to an electric motor.

11. A switch in accordance with claim 1 including a switch case in which said rheostat means and said rectifier means are disposed, said case comprising interfitting sections, and means on said case sections coacting with one another for separably holding said sections together in assembled relation.

12. A switch in accordance with claim 1 including a switch housing having a recess therein receiving the switch case and assembled switch components therein, said housing mounting said actuator means thereon, said rheostat means having a contactor extending above said switch case into coacting relation with said actuator means so that upon actuation of said actuator means said contactor is caused to move with respect to said resistance strip.

13. A switch in accordance with claim 10 including trimmer resistance means coupled in circuit with said rheostat means, for limiting the current to the motor.

14. A switch in accordance with claim 13 including a switch case in which said rheostat means and said trimmer means are disposed, and means coupled to said trimmer means for adjusting the latter from exteriorly of said case.

15. A switch in accordance with claim 14 wherein said switch case is disposed in a housing mounting said actuator means, said switch case having means thereon coacting with means on said housing for releasably interlocking said switch case in said housing, and said housing having an opening therein providing for accessibility to said means for adjusting said trimmer means from a location exteriorly of said housing.

16. A switch in accordance with claim 14 wherein said means for adjusting said trimmer means comprises a knob rotatably mounted in said case, means on said knob coacting with said trimmer means for adjusting the resistance value of said trimmer means upon rotation of said knob, and means on said knob adapted for coaction with a tool, such as a socket wrench, for rotating said knob.

17. A switch in accordance with claim 2 including an electrically conducting connection plate fastened to said resistance strip, said connection plate having clip means thereon, a time constant circuit means including capacitor means, and trigger means for said control switch means having conducting lines connecting to said clip means.

18. A switch in accordance with claim 1 and wherein the stationary contact members are in circuit with plug-in terminals to which the conducting lines of said source are removably attached.

19. A switch in accordance with claim 1 and wherein the control switch means comprises a bidirectional current control switch.

References Cited

UNITED STATES PATENTS

| | | | |
|---|---|---|---|
| 3,327,196 | 6/1967 | Sahrbacker | 318—345 |
| 3,329,842 | 7/1967 | Brown | 318—345 X |
| 3,356,814 | 12/1967 | France | 200—157 |

ORIS L. RADER, Primary Examiner

R. J. HICKEY, Assistant Examiner

U.S. Cl. X.R.

200—157; 338—200